United States Patent Office 3,423,180
Patented Jan. 21, 1969

1

3,423,180
OXIDATION OF SOLUBLE SULFIDE COMPOUNDS
James Hoekstra, Evergreen Park, Ill., assignor to Universal Oil Products Company, Des Plaines, Ill., a corporation of Delaware
No Drawing. Filed Dec. 27, 1966, Ser. No. 604,658
U.S. Cl. 23—224                                11 Claims
Int. Cl. C01b 17/06

ABSTRACT OF THE DISCLOSURE

Process for oxidizing a sulfide compound to elemental sulfur by simultaneously contacting a solution of the sulfide, oxygen, and a sulfur solvent with a solid oxidizing catalyst at a temperature of 0°–200° C.

---

The subject of the present invention is an improved process for the catalytic oxidation of soluble sulfide compounds. More precisely, the present invention is concerned with the rectification of a deactivation problem that has heretofore plagued processes, for oxidizing sulfide solutions, which employ a solid oxidizing catalyst and which are operated at conditions effecting oxidation of substantially all of the sulfide compound contained therein. This deactivation problem essentially involves the deposition of elemental sulfur on the solid catalyst. This deposited sulfur blocks access of the reactants to the active sites of the catalytic surface and, consequently, deactivates the catalyst. The concept of the present invention follows from my recognition that an ideal solution to this deactivation problem involves a procedure to simultaneously remove the deposited sulfur at the same rate at which it is deposited. Furthermore, I have found such a procedure, and it essentially involves the use of a sulfur solvent in admixture with the sulfide solution. This sulfur solvent is, accordingly, utilized in the present invention to remove deposited sulfur from the solid catalyst, at the same rate it is formed, thereby preventing this type of catalyst deactivation. Moreover, I have unexpectedly found that the present invention will increase the selectivity of the oxidation reaction for sulfur production and the rate of the reaction.

As part of the price that has to be paid for a modern industrial society, large quantities of undesired solutions of sulfide compounds are currently available as waste streams from a number of industrial sources. In particular, aqueous solutions containing hydrogen sulfide are undesired side products of many economically significant industrial processes in the chemical, petroleum, and steel industries. For instances, in the petroleum industry large quantities of solutions of sulfide compounds are produced by such processes as hydrorefining, hydrocracking, reforming and the like. In fact, a common feature of all of these processes is that they operate on a petroleum fraction, a shale oil, a coil tar oil, and the like, which invariably contain quantities of organic sulfur compounds. During the course of these petroleum processess, these organic sulfur compounds are converted into hydrogen sulfide and hydrocarbons. This hydrogen sulfide is then, typically, removed from these processes by absorption is suitable scrubbing solutions. In a large measure, these scrubbing solutions are aqueous, alkaline solutions, and their disposal presents quite a problem, because of their potential oxygen demand which is a consequence of the presence of sulfide ion. In a case of particular interest, hydrorefining of petroleum distillates, large quantities of ammonia and hydrogen sulfide are produced, and these are generally absorbed in an aqueous solution which is withdrawn from the process. In a similar vein, sweetening treatment of natural gas with a suitable scrubbing fluid, such as monoethanolamine, also results in a solution containing sulfide ion.

2

The sulfide compound present in these solutions is generally present as a salt of a strong base such as ammonium sulfide, sodium sulfide, potassium sulfide, and the like, which may be ionized to various degrees. Moreover, the sulfide compound may be present in the same kind of polar association which characterizes, for instance, solutions of hydrogen sulfide in diethanolamine. In this respect, it should be remembered that hydrogen sulfide because of its polar nature is soluble in aqueous solutions to some degree even in the absence of an appropriate solubility-increasing agent; for example, at 20° C. and 1 atmosphere pressure, 2.5 ml. of hydrogen sulfide will dissolve in 1 ml. of water. Thus, hydrogen sulfide is within the class of sulfide compounds that are present in these solutions.

Quite understandably, in recent years attention has been focused upon means of converting these sulfide compounds into forms that have less demand for oxygen and, if possible, into a form that has substantial economic value. I have now found an improvement in a process for converting these sulfide compounds, which process can, if desired, be utilized to transform them into valuable elemental sulfur and, alternatively, into sulfur compounds of reduced oxygen demand suitable for discharge into rivers and streams, if sulfur production is not economically feasible. Basically, my improvement involves a procedure for preventing the buildup of deactivating sulfur deposits on a solid catalyst when it is employed to effect the desired conversion.

It is, accordingly, one object of my invention to provide an improvement in a process for the production of elemental sulfur from a sulfide solution. A second object is to provide an improvement in a process for reducing the biological oxygen demand of a sulfide solution. A third object is to increase the rate of a sulfide oxidation reaction. Another object is to provide a procedure to prevent deactivation of a solid catalyst employed in sulfide oxidation service. Still another object is to provide a simple procedure for continuously stripping sulfur from the surface of a solid catalyst which is simultaneously being employed in sulfide oxidation service. An additional object is to increase the selectivity for elemental sulfur of a process for producing elemental sulfur from a sulfide solution.

In a broad embodiment, the present invention relates to a process for the oxidation of a soluble sulfide compound which comprises contacting a solution of said sulfide compound, oxygen, and a sulfur solvent with a solid oxidizing catalyst in a reaction zone at oxidizing conditions effecting production of elemental sulfur.

Another broad embodiment encompasses a process for the oxidation of a soluble sulfide compound which utilizes a sulfur solvent that is substantially immiscible with the sulfide solution. This process comprises the steps of: contacting the sulfide solution, oxygen, and the substantially immiscible sulfur solvent with a solid oxidizing catalyst in a reaction zone at oxidizing conditions effecting the production of elemental sulfur; withdrawing the effluent from the reaction zone and passing it to a separation zone in which a sulfur solvent phase separates from a treated sulfide solution phase; subjecting at least a portion of the sulfur solvent phase in a sulfur recovery zone to conditions effecting the crystallization of at least a portion of the sulfur dissolved therein; and recycling at least a portion of the resultant treated sulfur solvent to the reaction zone.

Other embodiments and objects of the present invention encompass particular sulfide-containing solutions, solid oxidizing catalysts, process conditions, sulfur solvents, and process configurations, which are hereinafter disclosed in the discussion of each of these facets of the present invention.

At this point it is to be recognized that a prominent feature of the present invention is the utilization of a sulfur solvent to prevent the buildup of deposited sulfur on the surface of a solid catalyst employed in sulfide solution oxidation service. This procedure results in the removal of the deposited sulfur at the same rate at which it is formed; thus, the deactivating effect of this deposited sulfur is greatly reduced. Additionally, it is an advantage of the present invention that the sulfur is withdrawn from the reaction zone in a form that facilitates the recovery of elemental sulfur as will be hereinafter discussed. Another advantage of the present invention is the fact that the sulfur solvent acts to increase the solubility of oxygen in the resultant reactant mixture which in turn increases the availability of oxygen for the reactions of interest, and this effectively increases the rate of the reaction. Still another advantage of the present invention is that the sulfur solvent markedly increases the selectivity of the oxidation reaction for the production of elemental sulfur, which as previously explained is a valuable commercial commodity. This last advantage is, undoubtedly, a mass action effect flowing from the capability of the present invention to constantly remove the product of this sulfur production reaction; this inhibits the reverse reaction and, thus, shifts the reaction mix toward sulfur production.

As pointed out hereinbefore, the solution to be charged to the process of the present invention contains a sulfide compound. This solution may be derived from any industrial operation such as those commonly available from chemical plants, sewage treatment plants, etc. The solvent utilized in forming the solution may be aqueous, alcoholic, or another suitable polar organic solvent. The solution is typically an aqueous solution and as such is commonly referred to as "waste water." In some cases, it is desired to convert the sulfide compounds contained in this solution to the corresponding sulfite, thiosulfate, sulfate, dithionate, etc., which are in a highly oxidized state and, thus, have little demand for oxygen. On the other hand, it may be desired to convert the sulfide compounds to elemental sulfur. In either case the process of the present invention can effect the desired transformation. Furthermore, the sulfide compounds are generally present in small concentrations—less than 5% by weight of the solution—although the present invention works well with solutions having a higher concentration of sulfide compounds. In addition, the solution typically contains one or more components which enhance the solubility of the sulfide in the solution; examples of these are: ammonia; metal salts of weak acids such as alkali metal carbonates, phosphates, etc.; organic bases such as methyl amine, ethyl amine, ethanol amine, propanol amine, etc.; and others well known to the art. As previously noted, a particularly important class of solutions are ammoniacal, aqueous solutions of hydrogen sulfide.

Another essential reactant for the process of the present invention is oxygen. This may be present in any suitable form, either by itself or mixed with other gases. In an embodiment of the present invention in which it is desired to produce elemental sulfur, oxygen is utilized in approximately the stoichiometric amount needed to effect this transformation—preferably, about 0.50 to about 1.50 moles of oxygen for every mole of sulfide. Alternatively, if it is desired to minimize the oxygen demand of the solution in order to allow its discharge into streams and rivers, then oxygen is present in an amount in excess of the stoichiometric amount to convert sulfide to sulfate—preferably; in an amount greater than approximately 2.0 moles of oxygen per mole of sulfide.

As previously indicated as an essential feature of the present invention is the use of a sulfur solvent to effect removal of deposited sulfur from the solid catalyst. Any suitable sulfur solvent may be utilized provided that it is substantially inert to the conditions utilized for the sulfide oxidation reaction and that it dissolves substantial quantities of sulfur. Examples of typical sulfur solvents are: disulfide compounds such as carbon disulfide, methyl disulfide, ethyl disulfide, methyl ethyl disulfide, etc.; aromatic compounds such as benzene, toluene, xylene, ethyl benzene, naphthalene, 2-methylnaphthalene, aniline, phenol, quinoline, etc.; aliphatic paraffins such as the pentanes, hexanes, heptanes, octanes, nonanes, decanes, etc.; cyclic paraffins such as methylcyclopentane, cyclopentane, cyclohexane, etc.; halogenated compounds such as butyl chloride, propyl bromide, ethylene dibromide, chlorobenzene, dichlorobenzene, etc.; aliphatic olefinic hydrocarbons such as the pentenes, pentadienes, hexenes, hexadienes, octenes, etc.; cyclic olefinic hydrocarbons such as cyclopentenes, cyclohexene, etc.; and the like solvents. Moreover, mixtures of these solvents may be used if desired. In connection with these examples, it is to be recognized that these are only representative of the type of sulfur solvent to be utilized in the present invention, and that the scope of the present invention is intended to include any other sulfur solvent that will accomplish the stated objectives.

In general, the preferred operation of the present invention encompasses the utilization of a sulfur solvent that is substantially immiscible with the sulfide solution that is to be oxidized. Further, the solubility of sulfur in the solvent is preferably such that it is markedly greater at a temperature in the range of about 80° C. to about 200° C. than it is at temperatures in the range of about 0° C. to about 75° C. This last preference facilitates removal of the sulfur thru crystallization, if such is desired. Considering all of these requirements, I have found that, when the sulfide solution is aqueous, the preferred sulfur solvent is selected from the group consisting of benzene, toluene, xylene, and mixtures thereof.

Broadly, the volumetric ratio of sulfur solvent to sulfide solution that can be utilized in the present invention can be computed as a function of the net sulfur production for the particular sulfide solution and catalyst selected, and of the solubility characteristics of the sulfur solvent. The ratio is selected such that there is at least enough sulfur solvent present to carry away the net sulfur production from the oxidation reaction. As a practical matter, I have found it convenient to operate at a level substantially in excess of this minimum amount; for example, for aqueous sulfide solutions of less than 10% by weight sulfur, I have found a volumetric ratio of one gives good results. In other embodiments, the exact selection can be made, if desired, by suitable experimentation familiar to those skilled in the art.

As previously indicated the oxidation process of the present invention utilizes a solid oxidizing catalyst. Any suitable solid oxidizing catalyst that is capable of effecting substantially complete oxidation of the sulfide compounds may be utilized in the present invention. However, it should be noted that the problem of catalyst deactivation due to sulfur deposition will typically differ as to degree of severity depending on the particular catalyst utilized. In any event, I have found that two particularly preferred classes of catalyst for the reactions of interest are metallic sulfide catalysts and metal phthalocyanine catalysts, and that these preferred catalysts are deactivated by sulfur deposition during use.

The preferred metallic sulfide catalyst is selected from the group consisting of sulfides of nickel, cobalt, and iron, with nickel being most preferred. Moreover, in some cases mixtures of these metallic sulfides may be employed. Although it is possible to practice the present invention with a solid bed of the metallic sulfide, it is preferred that the metallic sulfide be composited with a suitable carrier material. Examples of suitable carrier materials are: charcoal, such as wood charcoal, bone charcoal, etc. which may be activated prior to use; alumina, silica, zirconia, kieselguhr, bauxite, carbons, and other natural or synthetic highly porous inorganic carrier materials. The preferred carrier materials are alumina and activated charcoal. Any suitable means of compositing the catalyst with the support may be used, such as impregnating it by immersing it in a solution of soluble salt of the desired metallic components, thereafter washing and drying it. The metallic component can then be converted to the sulfide by treatment with hydrogen sulfide, preferably at room temperature, or utilized as such in the process with the conversion to the sulfide being effected during the initial part of the processing period. In some cases, it may be advantageous to calcine the impregnated carrier material prior to sulfiding it. In general, when the metallic sulfide is composited with a carrier material, the amount by weight of the metallic component may range up to 60% or more of the total composite. However, it is generally preferred to operate in the range of about 10% to about 50% by weight of the total composite.

Yet another preferred catalyst for use in the present invention is a metal phthalocyanine catalyst composited with a suitable carrier material. Particularly preferred metal phthalocyanine catalysts include those of cobalt and vanadium. Other metal phthalocyanine catalysts that may be utilized include those of iron, nickel, copper, molybdenum, manganese, tungsten, and the like. Moreover, any suitable derivative of the metal phthalocyanine may be employed including the sulfonated derivatives, the carboxylated derivatives, and the like. In the present invention, the phthalocyanine catalyst is utilized as a composite with a suitable adsorptive carrier material. The preferred carrier material is activated carbon. Additional details as to alternative carrier materials, method of preparation, and the preferred amounts of catalytic components, are given in the teaching of U.S. Patent No. 3,108,081 for these phthalocyanine catalysts.

The process of the present invention can be effected in any suitable manner—either a batch or a continuous operation. A particularly preferred system involves a fixed bed of solid oxidizing catalyst disposed in a reaction zone. The sulfide solution in admixture with the sulfur solvent is then passed therethrough in either upward, radial, or downward flow; and the oxygen is passed thereto in either concurrent or countercurrent flow. In other embodiments, the catalyst may be utilized in a slurry or suspensoid operation wherein the catalyst passes countercurrently or concurrently to the sulfide solution, sulfur solvent, and oxygen. In other cases, it may be advantageous to effect the oxidation reaction in a multi-stage manner.

In any event, the effluent from the reaction zone is passed to a separating zone. Here, in the preferred operation in which an immiscible sulfur solvent is utilized, a sulfur solvent phase separates from a treated sulfide solution phase. At least a portion of the sulfur solvent phase is then withdrawn from the separating zone, and is passed to a sulfur recovery zone in which at least a portion of its dissolved sulfur is removed by any of the methods well known in the art. A preferred procedure is to cool the sulfur solvent to the point where crystallization begins, and the precipitated sulfur is then drawn off from the bottom of the sulfur recovery zone as a slurry. This slurry can then be treated to recover the solid sulfur by any of the methods known in the art of removing solid particles from a liquid such as filtration, centrifugation, settling, etc. In this connection it should be noted that it may be necessary to initially seed the sulfur recovery zone with sulfur crystals in order to start the mechanics of crystallization. In addition, it should be understood that not all of the sulfur solvents recovered from the separating zone need be treated in the sulfur recovery zone; it is usually only necessary to treat an amount sufficient to remove the net production of sulfur.

A suitable alternative procedure for operation of the sulfur recovery zone involves the distillation of a least some of the sulfur solvent in order to precipitate the net amount of sulfur being produced in the reaction zone.

In any event, the lean solvent from the sulfur recovery zone is, in a preferred embodiment, admixed with the remaining portion of the sulfur solvent phase from the separating zone, and the mixtures are then recycled to the reaction zone.

It is to be noted that in a nonpreferred embodiment in which the sulfur solvent is miscible with the sulfide solution, the separating zone referred to hereinabove will typically be a fractionating system designed to effect the desired separation. And the sulfur recovery zone, in this embodiment, may be a portion of this fractionating system.

It is to be recognized that the treated sulfide solution phase that is withdrawn from the previously mentioned separating zone may be further utilized in a variety of ways. For instance, since it is typically reduced in sulfide content, it may be recycled to the industrial process from which it came for further use therein. On the other hand, this treated effluent may, depending on the operating conditions employed in the present invention, be sufficiently reduced in biological oxygen demand that it can be suitably discharged into streams and rivers.

Returning to the oxidation reaction of the present invention, it is effected at any suitable temperature which may range from about 0° C. to about 200° C. or more. When the process of the present invention is operated so that elemental sulfur is produced with high selectivity, it is preferred to operate in the range of about 0° C. to about 125° C. And when the process is operated to produce sulfate with high selectivity (n.b. elemental sulfur is still produced as a minor product), it is preferred to operate in a range of about 100° to about 200° C.

The pressure employed can be any pressure which maintains the sulfide solution and sulfur solvent in the liquid phase. In general, it is preferred to operate at superatmospheric pressures, and a pressure from about 25 p.s.i.g. to about 75 p.s.i.g. is particularly suitable.

Liquid hourly space velocity (LHSV) is defined to be the volume rate of charging of sulfide solution divided by the total volume of catalyst within the oxidation zone (n.b. this is the space volume occupied by the catalyst bed). For my process, I have found that, whereas any suitable LHSV can be utilized, I prefer to operate in the range of about 0.5 to about 4.0.

The following examples are given to illustrate further the novelty, mode of operation, and utility of the present invention. It is not intended to limit unduly the present invention to the flow scheme, process conditions and type of catalysts employed therein, since these are intended to be illustrative rather than restrictive.

Example I

This example shows the substantial sulfur acquisition capability of a solid oxidizing catalyst when it is employed in sulfide solution oxidation service without the benefits of the present invention.

An alumina carrier material was manufactured in accordance with the method delineated in my U.S. Patent No. 2,620,314 by passing droplets of an alumina hydrosol into an oil bath by means of a nozzle or rotating disk. After specific aging, drying, and calcining as specified in the referenced patent, the carrier material was impregnated, in a rotary evaporator, with a solution of nickel nitrate in an amount sufficient to result in a final composite having 20% nickel by weight. After drying, the impregnated carrier material was saturated with gaseous ammonia and, thereafter, subjected to a temperature of 95° C. in order to drive off excess ammonia. Subsequently, the resultant composite was successively washed with water, dried, and sulfided by passing a stream of hydrogen sulfied with nitrogen over it at room temperature.

The resultant catalyst, in an amount of 100 cc. was then charged to a reaction zone. An aqueous feed stream, containing 1.67% by weight ammonia and 2.35% by weight sulfide (calculated as sulfur) was then charged to the reaction zone at a rate of 100 ml. per hour, thus setting the LHSV at about one. The reaction zone was maintained at an inlet pressure of 50 p.s.i.g. and a temperature of 35° C. In addition, air was injected into the reaction zone at a rate sufficient to supply 1.2 atoms of oxygen for each atom of sulfur in the sulfide feed stream.

After a line-out period the run was divided into a series of test periods of three hours duration. During these test periods the effluent from the reaction zone was collected. Thereafter, these samples were analyzed, using conventional techniques, for kind and quantity of sulfur compounds. Results in this analysis were: for the first test period, a conversion of sulfide of 98% based on sulfur in the feed stream, but of the 95% of the sulfide that went to elemental sulfur only 19% of the resultant sulfur was recovered in the effluent; for the second test period, on the same basis as before, the conversion of sulfide was 93%, and of the 90% of the sulfide that went to elemental sulfur, only 50% of the sulfur was recovered in the effluent; and for the third period, the conversion of sulfide was 91%, and of the 85% of the sulfide in the feed stream that went to elemental sulfur, only 60% of the resultant sulfur showed up in the effluent. Hence, it is clear that substantial quantities of sulfur were being deposited on the catalyst. This fact was confirmed by subsequent analysis of the catalyst.

This data then highlights the substantial deposition of elemental sulfur on the catalyst along with the attendant decline in catalyst activity, which characterizes this sulfide oxidation process when it is run in a straightforward fashion.

Example II

In order to clearly show the benefits of the present invention, a run was made using the process of the present invention with the same feed stream and catalyst of Example I. The only change in the process conditions was that the rate of injection of air was sufficient to supply 2.0 atoms of oxygen per atom of sulfur in the feed stream. In accordance with the present invention, xylene was injected into the reaction zone in admixture with the sulfide solution at a volumetric rate of 100 cc. per hour such that the volumetric ratio of sulfur solvent to feed stream was set at one. The effluent from the reaction zone was passed to a separating zone in which a xylene phase separated from an aqueous phase. These phases were then separately analyzed to determine their sulfur content. It is to be noted that essentially all of the sulfur that appears in the xylene phase is present as elemental sulfur, whereas that in the aqueous phase is present as higher oxidation products such as sulfite, dithionate, etc., and any unreacted sulfide.

After a line-out period, the run was divided into a series of test periods of four hours. Results for these periods of the analysis are given in Table I.

TABLE I.—SUMMARY OF RESULTS OF NiS ON ALUMINA RUN

| Period No. | Percent sulfide converted* | Percent total S recovery* | Percent total S in aqueous phase* | Percent total S in xylene phase* |
|---|---|---|---|---|
| 1 | 100 | 104.8 | 21.8 | 83.0 |
| 2 | 100 | 112.5 | 23.2 | 89.3 |
| 3 | 100 | 86.5 | 20.5 | 66.0 |
| 4 | 100 | 93.8 | 23.4 | 70.4 |
| 5 | 100 | 109.6 | 22.1 | 87.5 |
| 6 | 100 | 106.9 | 22.1 | 84.8 |

*Based on the amount of sulfur in the feed stream and calculated as elemental S.

From this table, it can be seen that a high rate of activity of the catalyst for sulfide oxidation was exhibited throughout the run. In addition, with allowances for minor variations in the rate of removal of deposited sulfur from the catalyst, it is clear that substantially all of the sulfur produced is being removed from the reaction zone; for example, consider the results for Period 4 which shows that 93.8% of the sulfur charged to the plant during this period turned up in the effluent and that 70.4% of it showed up as elemental sulfur in the xylene phase whereas only 23.4% of it appeared in the aqueous phase as the water soluble oxidation products of the reaction.

This example clearly shows the capability of the present invention to prevent deposition of substantial quantities of elemental uslfur on the catalyst and to retard deactivation from this mechanism.

Example III

A composite of cobalt phthalocyanine monosulfonate on activated carbon was prepared by dissolving cobalt phthalocyanine sulfonate in water to which ammonium hydroxide was added. Activated carbon granules of 30 to 40 mesh were added to the solution with stirring. The mixture was allowed to stand, and then was filtered to separate excess water. The catalyst was dried and was found to contain 0.5% by weight of the phthalocyanine catalyst.

100 cc. of this catalyst were then charged to a reaction zone. A sulfide solution in admixture with an equal volume of xylene was then charged to the zone. The composition of the sulfide solution and the process conditions were the same as those reported in Example II. Results of the analysis of the effluent from the reaction zone are given in Table II.

TABLE II.—SUMMARY OF RESULTS OF COBALT PHTHALOCYANINE ON CARBON RUN

| Period No. | Percent sulfide converted* | Percent total S recovery* | Percent total S in aqueous phase* | Percent total S in xylene phase* |
|---|---|---|---|---|
| 1 | 99 | 99.2 | 28.0 | 71.2 |
| 2 |  | 100.4 | 31.2 | 69.2 |
| 3 | 97 | 98.5 | 33.3 | 65.2 |
| 4 |  | 100.9 | 28.9 | 72.0 |
| 5 | 95 | 98.4 | 39.7 | 58.7 |
| 6 |  | 98.0 | 29.6 | 68.4 |

*Based on the amount of sulfur in the feed stream and calculated in all cases as elemental S.

Remembering that essentially all of the sulfur in the xylene phase is elemental sulfur whereas the higher oxidation products appear in the aqueous phase, it is once again evident from the data of Table II that substantial quantities of elemental sulfur are not being accumulated on the catalyst, and that the activity of the catalyst is being maintained at high levels. These results are in sharp contrast with the results obtained when the process is run without xylene being charged to the zone. In this latter case up to 50% of the elemental sulfur that is formed remains on the catalyst and the activity of the catalyst declines rapidly.

Example IV

An aqueous waste stream, containing 0.5% by weight sulfide, from a hydrorefining operation is admixed with an equal volume of dichlorobenzene, and the resultant mixture is charged to a reaction zone, which is loaded with a catalyst prepared in accordance with the method delineated in Example I. The reaction zone is maintained at a temperature of 125° C. and a pressure of 50 p.s.i.g. Air in an amount sufficient to supply 2.0 times the stoichiometric amount of oxygen needed to oxidize the sulfide in the waste stream is also injected into the reaction zone. The rate of charging the resultant mixture of waste solution and dichlorobenzene is sufficient to maintain a LHSV of 2.0 based on the mixed solution.

The effluent from the reaction zone is passed to a separating zone which is maintained at the same temperature as the reaction zone. Here a sulfur-containing dichlorobenzene phase separates from a treated aqueous phase. The sulfur-containing dichlorobenzene phase is then passed through cooling means to a sulfur recovery zone which is maintained at a temperature of about 50° C. In this latter zone, a precipitate of sulfur forms and settles to the bottom of the zone. A slurry of the precipitated sulfur is drawn off from the bottom of this sulfur recovery zone, and it is subjected to filtering to recover elemental sulfur. A lean dichlorobenzene solution is removed from the upper regions of this sulfur recovery zone, passed thru a heating means to restore its temperature to about 125° C., and then recycled to the reaction zone.

The process is operated for a sustained period of time with essentially no deactivation of the catalyst due to sulfur deposition, and with recovery of substantial quantities of sulfur. Throughout this period the aqueous phase that is removed from the separating zone is sufficiently reduced in sulfide content to allow its safe disposal into streams and rivers.

Example V

Straight run gasoline is washed with a dilute (i.e., 5° Baume) sodium hydroxide solution in a washing zone in order to remove hydrogen sulfide. The washing solution is periodically withdrawn from the bottom of the washing zone and found to contain significant quantities of sodium sulfide. It is then commingled with an equal volume of benzene and charged to a reaction zone where it is contacted, at conditions similar to those of Example IV, with air in an amount sufficient to provide the stoichiometric amount of oxygen necessary to effect oxidation of the sodium sulfide to sodium sulfate, and with a catalyst prepared in accordance with the method delineated in Example I. The effluent from the reaction zone is passed to a separating zone where a benzene phase separates from an aqueous phase. The benzene phase is withdrawn and subjected to crystallization conditions and then recycled to the reaction zone. The aqueous phase is withdrawn from the separating zone and found to have very little biological oxygen demand. It is, consequently, discharged into a neighboring stream. The process is operated for a prolonged period of time and the catalyst in the reaction zone is not deactivated by sulfur deposition.

Example VI

This example presents the results of a series of experiments, with a batch embodiment of the present invention, designed to demonstrate the substantial improvement in reaction rate and selectivity for elemental sulfur production which are singular characteristics of the present invention.

A series of experiments were performed in a three-neck laboratory flask which was fitted with a conventional rotary stirrer. For each experiment, an aqueous, ammoniacal solution of hydrogen sulfide, containing 1.67% by weight ammonia and 2.35% by weight sulfide (calculated as sulfur), was added in an amount of 400 ml. During the course of each experiment, air was injected into the flask at a rate equivalent to 0.25 mole of oxygen per gram-atom of sulfur in the solution per hour. The experiments were all performed at atmospheric pressure and were all started in a temperature of 25° C. Two different catalysts were utilized in these experiments; they were: for Experiments A and B, 4 grams of 0.5 phthalocyanine monosulfonate on "Nuchar WA" activated carbon prepared in accordance with the method delineated in Example III; and for Experiments C and D, 10 grams of a nickel sulfide on alumina catalyst, containing 20% by weight nickel which was prepared according to the method outlined in Example I.

In order to clearly show some of the benefits of the present invention, 400 ml. of xylene were added to the flask for Experiments B and D, whereas Experiments A and C were run in the absence of any sulfur solvent.

Since the sulfide oxidation reaction is exothermic and since no attempt was made to control temperature in the flask during the experiment, the temperature in the flask rose during each of the experiments. As might be expected, it has been determined that this temperature rise is indicative of the rate of the reaction. Furthermore, the completion of the reaction is indicated by a rapid drop in temperature after reaching a maximum. Therefore, at the completion of the reaction the contents of the flask for each experiment were subjected to a conventional analysis for elemental sulfur. The results of the experiment and analysis are given in Table III.

TABLE III.—RESULTS OF COMPARISON TEST

| Experiment | A | B | C | D |
|---|---|---|---|---|
| Xylene, ml | 0 | 400 | 0 | 400 |
| Sulfide solution, ml | 400 | 400 | 400 | 400 |
| ΔT in first hour, °F | 4 | 7.5 | 7 | 8 |
| Time to max. T., hours | 4.5 | 3.8 | 3.8 | 4.0 |
| S° yield, percent | 60 | 83 | 78 | 85 |

From this table, it can be seen that for Experiments B and D there is a marked improvement in elemental sulfur yield—namely, 13% in B and 7% in D—over the corresponding control Experiments A and C. This clearly manifests the improved selectivity for sulfur production which is a marked attribute of the process of the present invention. Likewise, the increased reaction rate for the process of the present invention is clearly exhibited in the numbers for temperature rise in the first hour and the time to the maximum temperature, both of which, as previously explained, are indicative of reaction rate. For example, for the phthalocyanine catalyst, the results show a 3.5° F. greater temperature rise in the first hour and a completion of the reaction in 3.8 hours, instead of 4.5 hours, for the process of the present invention. Hence, the superiority of the process of the present invention, in the areas of reaction rate and of selectivity for sulfur production, is evident.

I claim as my invention:

1. A process for the oxidation of a soluble sulfide compound which comprises introducing an aqueous solution of said sulfide compound together with oxygen into a reaction zone containing a solid oxidizing catalyst, therein contacting said solution and said oxygen with the catalyst at oxidizing conditions effecting production of elemental sulfur, simultaneously contacting said catalyst with a sulfur solvent substantially immiscible with said aqueous sulfide solution under conditions to remove the resulting liberated sulfur from the catalyst while increasing the solubility of said oxygen in the resultant reactant mixture, and withdrawing from the reaction zone an effluent comprising sulfur, solvent and water.

2. The process of claim 1 further characterized in that the effluent from said reaction zone is separated into a sulfur solvent phase and a treated sulfied solution phase.

3. The process of claim 2 further characterized in a portion of the dissolved sulfur contained therein, and that at least a portion of the resultant treated sulfur solvent is recycled to said reaction zone.

4. The process of claim 3 further characterized in that the treatment consists in subjecting said sulfur solvent phase to conditions effecting sulfur crystallization.

5. The process of claim 3 further characterized in that the treatment consists in subjecting said sulfur solvent phase to conditions effecting distillation of at least a portion of said sulfur solvent.

6. The process of claim 1 further characterized in that said sulfide solution is an aqueous, ammoniacal solution of hydrogen sulfide.

7. The process of claim 1 further characterized in that said sulfur solvent is an aromatic hydrocarbon.

8. The process of claim 1 further characterized in that said sulfur solvent is a halogenated hydrocarbon.

9. The process of claim 1 further characterized in that said sulfur solvent is xylene.

10. The process of claim 1 further characterized in that said solid oxidizing catalyst comprises a sulfied of a metal selected from the group consisting of nickel, iron, and cobalt, composited with a carrier material.

11. The process of claim 1 further characterized in that said solid oxidizing catalyst comprises a metal phthalocyanine composited with a carrier material.

References Cited

UNITED STATES PATENTS

| 2,972,512 | 2/1961 | Guinot | 23—225 X |
| 3,087,793 | 4/1963 | Hay | 23—225 |
| 2,419,324 | 4/1927 | Missbach | 23—224 |
| 2,559,325 | 7/1951 | Spillane | 23—224 |
| 2,586,914 | 2/1952 | Carney | 23—224 |
| 2,809,885 | 10/1957 | Ditman et al. | 23—224 X |
| 3,034,865 | 5/1962 | Urban | 23—225 |
| 3,149,920 | 9/1964 | Urban | 23—225 |

OSCAR R. VERTIZ, *Primary Examiner.*

G. O. PETERS, *Assistant Examiner.*

U.S. Cl. X.R.

23—225